UNITED STATES PATENT OFFICE.

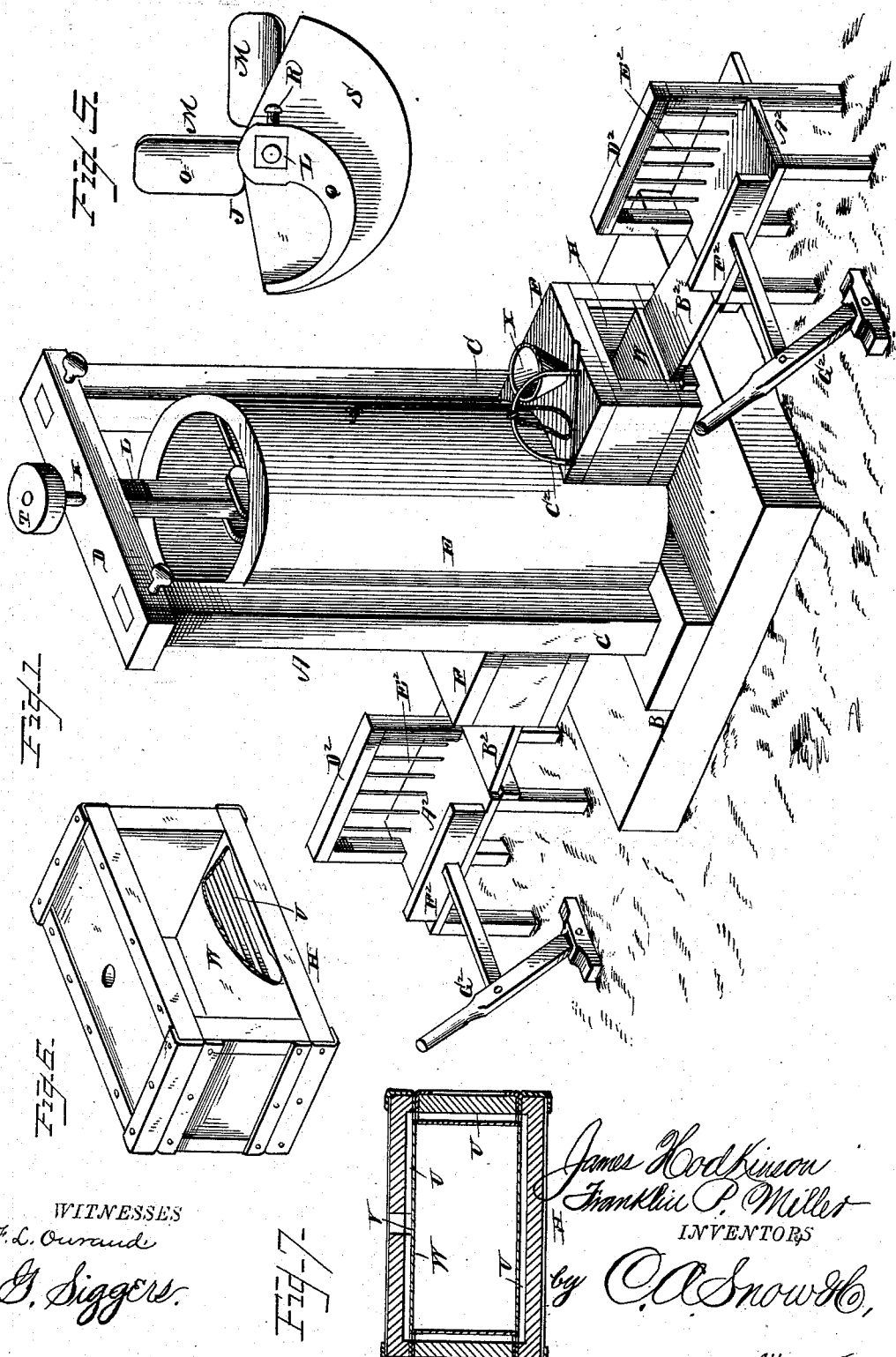

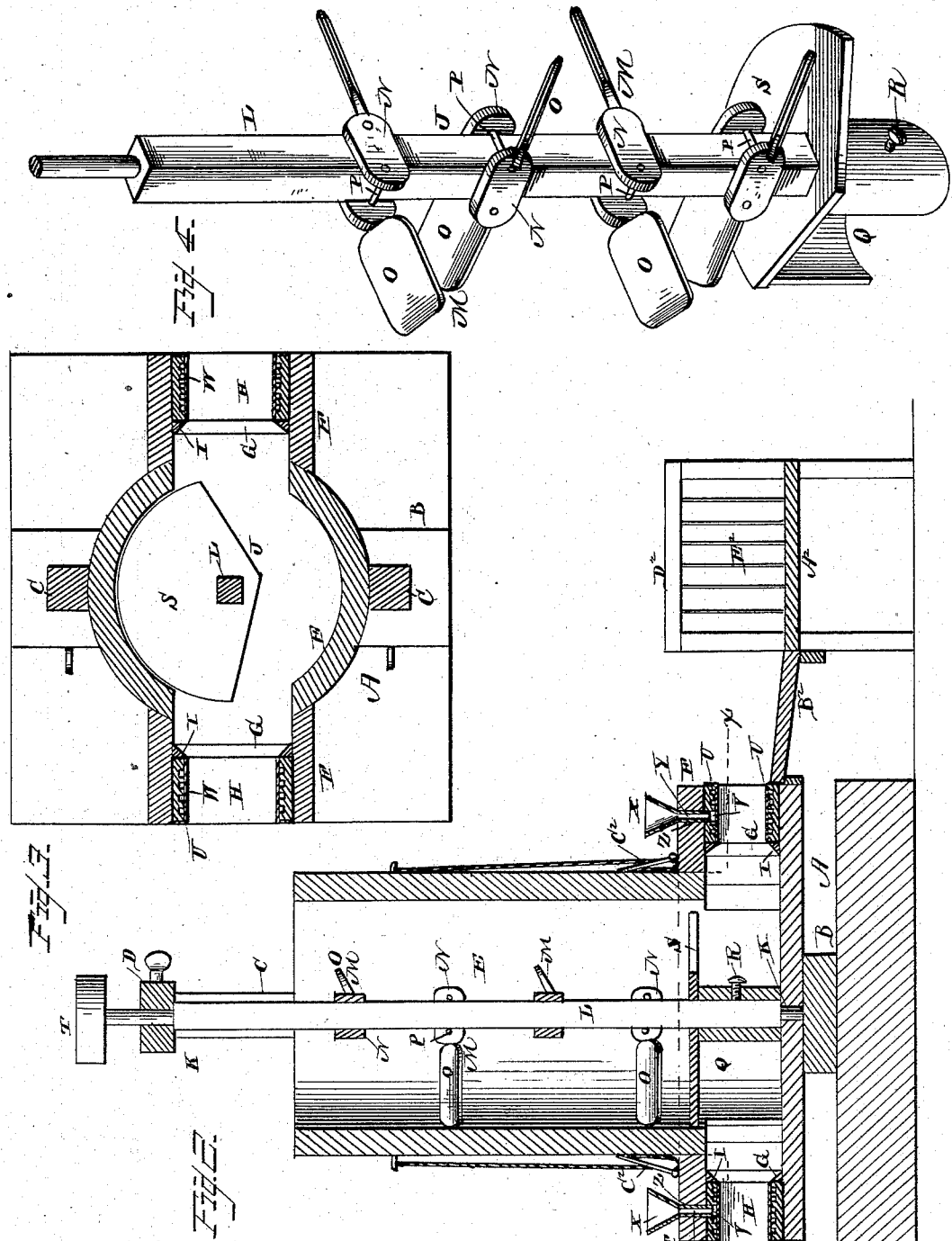

JAMES HODKINSON AND FRANKLIN P. MILLER, OF CHAMBERSBURG, PA.

BRICK-MACHINE.

SPECIFICATION forming part of Letters Patent No. 288,337, dated November 13, 1883.

Application filed September 29, 1883. (No model.)

*To all whom it may concern:*

Be it known that we, JAMES HODKINSON and FRANKLIN P. MILLER, citizens of the United States, residing at Chambersburg, in the county of Franklin and State of Pennsylvania, have invented a new and useful Brick-Machine, of which the following is a specification, reference being had to the accompanying drawings.

This invention relates to brick-machines, and its object is to provide a machine possessing superior advantages in point of simplicity, inexpensiveness, durability, and general efficiency.

In the drawings, Figure 1 is a perspective view of our improved brick-machine. Fig. 2 is a vertical longitudinal sectional view of the same. Fig. 3 is a horizontal sectional view taken through the machine on the line $x\,x$, Fig. 2. Fig. 4 is a perspective of the rotary feeder. Fig. 5 is a bottom view of the same. Fig. 6 is a detail perspective view of one of the press-boxes. Fig. 7 is a sectional view thereof, taken longitudinally through the grooves.

Referring to the drawings, A designates the frame of the machine, which comprises a base-block, B, from the ends of which project uprights C C, that are united at their tops by a cross-piece, D, these parts being preferably connected by suitable separable joints. Between uprights C C, and resting on base B, is secured an upright cylindrical hopper, E, into the top of which the clay is fed. At the bottom of this hopper E, and on diametrically-opposite sides, are provided rectangular extensions F F, that are provided with interior flanges, G, against which the removable mold-boxes H are seated in the mouth of said extensions F F, the inner edges, I, of the flanges being beveled or inclined, to facilitate the entrance of the clay into the mold-boxes.

J is a perpendicular rotary feeder, that is arranged in the hopper E and has its bearings K K in the bottom of hopper E and in the cross-piece D. The rectangular shaft L of feeder J is provided with a series of lateral wings, M, that serve to force the clay downward as the feeder rotates. These wings are preferably arranged in pairs, each wing comprising a securing plate or flange, N, from which extends a downwardly-inclined lateral plate, O, the flanges being clamped against opposite sides of shaft L by connecting screws or bolts P. By this arrangement the wings can be adjusted as desired on the shaft, and are preferably disposed one pair above the other, as shown. On the lower end of shaft L is secured a segmental or curved arm, Q, by means of a set-screw, R, and from the top of this arm projects a lateral horizontal flange, S, that serves to retain the clay at the bottom while it is being forced into the mold-box extensions F F by said arm Q. The feeder J can be operated by horse-power when a sweep is connected to its top end, by steam-power when a pulley, T, is fixed at its top, or by any other suitable means.

The rectangular mold-boxes H are adapted to neatly fit the mouth of the extensions K K, and are provided on their inner faces with longitudinal parallel grooves U, which register at the corners of the box, the top of the latter being provided with an auxiliary groove, V, that extends across the series of grooves U, for purposes that will be presently described. The inner faces of the mold-boxes are covered by a cloth or fabric, W, that forms the molding-surface, and is kept saturated by water in the grooves U. This water is fed to the grooves by means of a reservoir or funnel, X, arranged on extensions F F, and having a tube, Y, extending down through a perforation, Z, in the top of the extension and into the distributing-groove V, from which it flows through all the grooves U.

Adjoining the extensions F F, at the sides of the hopper E, are tables or platforms $A^2$, which are connected with the mouth of said extensions by an incline, $B^2$, by which arrangement the molded clay, as it feeds from the mold-boxes, will be automatically delivered upon the tables, it being cut into blocks of suitable size by a knife, $C^2$, suspended over the extensions F F. The tables $A^2\,A^2$ are provided with an upright frame, $D^2$, carrying a series of parallel vertical wires, $E^2$, which cut the block of clay received on the table into bricks of the desired size by being forced against the wires by a follower, $F^2$, pivotally connected to an operating-lever, $G^2$, as shown.

The operation and advantages of our invention will be readily understood. As the feeder revolves the clay is alternately forced into the opposite mold-boxes, from which it is delivered onto the tables, and is readily cut into brick of the desired size.

We claim as our invention—

1. A brick-machine comprising a cylindrical hopper, mold-boxes connected therewith on diametrically-opposite sides, and a rotary feeder journaled in the hopper and adapted to alternately feed the clay into the opposite mold-boxes, substantially as and for the purpose set forth.

2. The combination of a cylindrical hopper having a rectangular bottom-extension, a mold-box fitted neatly in the mouth of said extension, and a rotary feeder adapted to feed the clay from the hopper into the mold-box, substantially as and for the purpose set forth.

3. The combination of an upright cylindrical hopper, mold-boxes connected therewith at its bottom, receiving-tables adjoining the mold-boxes, inclines extending from the mold-boxes to the tables, and a rotary feeder journaled in the hopper and adapted to force the clay into and through the mold-boxes, when it will automatically feed down the incline onto the table, substantially as and for the purpose set forth.

4. In a brick-machine, the combination, with the rectangular shaft of the feeder, of a pair of wings comprising the securing-plates and projecting downwardly-inclined wings, and the screws or bolts by which the plates are clamped against opposite sides of the shaft, substantially as and for the purpose set forth.

5. The combination, with the rotary feeding-shaft, of a segmental or curved arm secured thereon, and provided with a horizontal segmental top flange, as and for the purpose set forth.

6. The combination, with an upright cylindrical hopper having lateral mold-extensions at its bottom, of an upright shaft journaled therein, and provided with a lateral series of downwardly-inclined wings, and with a segmental or curved arm at its bottom having the segmental horizontal top flange, substantially as and for the purpose set forth.

7. The combination, with a rectangular extension of the hopper having interior flanges, of a mold-box seated in the mouth of the extension against said flange and adapted to be moved therefrom, substantially as and for the purpose set forth.

8. The combination of the extension for containing the mold-box, the mold-box seated therein and provided with the registering series of longitudinal interior grooves and with a fabric or cloth covering its inner surface, and a water-receptacle leading into the series of grooves, substantially as and for the purpose set forth.

9. A brick-mold box having its inner surface covered by a mold cloth or fabric, and formed with grooves in its surface under the fabric, which grooves retain water to keep the fabric constantly saturated, as set forth.

10. In combination with the mold-box, a table or platform having a series of vertical wires, and a follower adapted to force the block or clay against and through said wires, substantially as and for the purpose set forth.

In testimony that we claim the foregoing as our own we have hereto affixed our signatures in presence of two witnesses.

JAMES HODKINSON.
FRANKLIN P. MILLER.

Witnesses:
W. H. H. MACKEY,
GEO. S. KYLE.